Patented June 21, 1927.

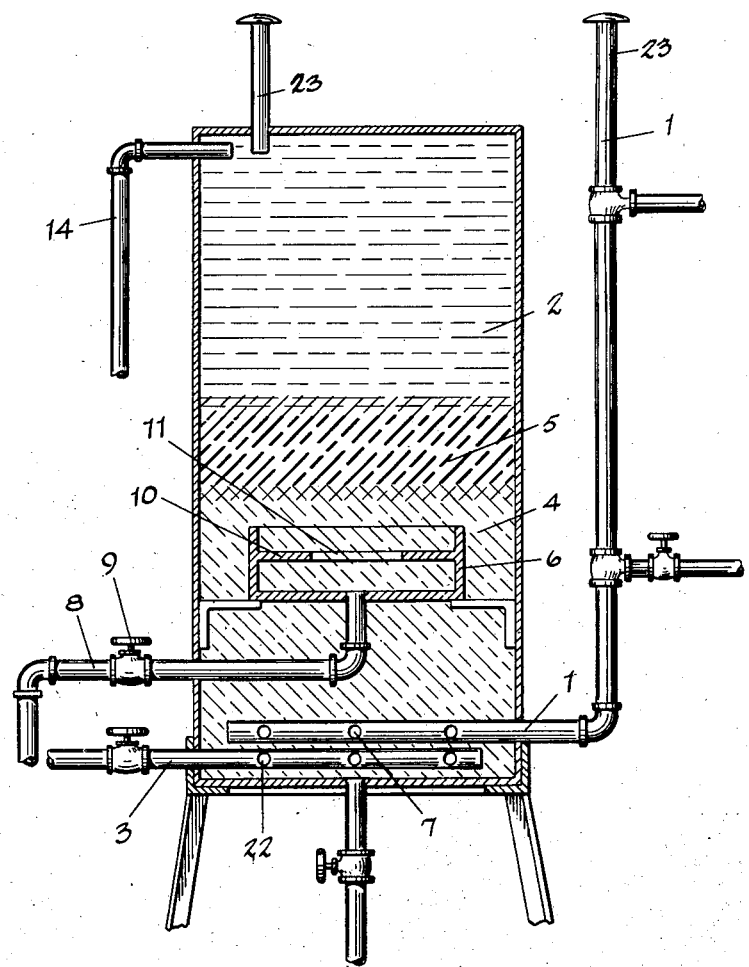

1,633,195

UNITED STATES PATENT OFFICE.

MAURICE M. SCHWAB AND SAMUEL S. SCHWAB, OF TOLEDO, OHIO.

SCRUBBER FOR DRY-CLEANING SYSTEMS.

Application filed June 4, 1923. Serial No. 643,160.

Our invention has for its object to provide an efficient means for scrubbing the cleansing liquid used in dry cleaning systems for removing soiling materials from fabrics.

In dry cleaning systems, the cleansing liquid and the fabric are subjected to thorough agitation which causes the liquid to flow through every part of the fabric and thus remove all soiling materials from the fabric. The liquid is then passed through a purifier and a scrubber. In the latter, the cleansing liquid is directed into another liquid, preferably water, which has a larger specific gravity than the cleansing liquid. The two liquids are introduced into the container at or near the bottom and as the cleansing liquid rises, a zone is created in which the soiling material in the cleansing liquid begins to drop out. The specific gravity of the water being greater than that of the cleansing liquid aids this action by tending to draw the soiling material as it sinks. A basin, located at a point below the zone of separation, receives a large portion of the mixture of water and material and draws this mixture off. As the cleansing liquid is drawn off at the top of the container, room is made for more at the bottom and the scrubber may be used continuously. The soiling materials, such as dirt and grease, are removed from the scrubber during the process so that the washing, or fabric agitation, may be continuous. After leaving one or more scrubbers of different forms, the cleansing liquid may be returned to a supply tank, or may be used continuously in the process. I have provided a scrubber for continuously purifying the cleansing liquid in dry cleaning systems.

The invention may be contained in structures which vary in form and, to illustrate a practical application of the invention, we have selected a form of scrubber containing the invention and shall describe it hereinafter. The scrubber selected as an example is shown in the accompanying drawing. The figure shown in the drawing is a cross section of the scrubber.

After the cleansing liquid has been agitated with the soiled fabrics and has passed through the purifier where it is mixed with a purifying material, it is passed out through pipe 1 into the scrubber 2. The inlet of the scrubber 2 from the pipe 1 permits the cleaning fluid to disseminate itself over the bottom of the scrubber. The scrubber is partly filled with water, which is admitted through the pipe 3 and the cleaning liquid passes up through the water 4 and is thus washed or scrubbed by its movement through the water. The water removes all sediments and the alkali materials that may be removed from the purifier and carried over by the cleaning fluid. By reason of the difference in specific gravity of the water 4 and the cleaning fluid the cleaning fluid rises to the surface of the water. Intermediate the cleaning fluid and the water within the scrubber there is a layer, such as the layer 5, of surcharged soiling material that is removed by the cleaning fluid from the fabrics and which is carried into the scrubber. This seems to be due to the saturation of the soiling material with particles or minute drops of the cleaning fluid which, by reason of their combined weight, float at a point near the surface of the water, which, however, as the water causes the separation of the drops of gasoline from the soiled particles by reason of the difference in the specific gravity of the water and the gasoline, the soiling material settles. As the heavier soiled particles separate from the gasoline drops they settle in the water and cause it to become soiled or dirty. In case of grease removed by the cleaning fluid, the caustic in the purifier apparently attacks the grease and makes it soluble in water so that when it is carried over into the scrubber it remains in the water, causing the water to become soiled or dirty. Thus the water gathers practically the remainder of the soiling material that may have been removed from the fabrics and carried over from the purifier.

In order that the water of the scrubber may be continuously or intermittently renewed without withdrawing the cleaning fluid we have provided a means for withdrawing the water without removing the cleaning fluid, notwithstanding the mechanical mixture constantly existing by reason of the flowing of the cleaning fluid through the water. A basin 6 is located in the lower part of the scrubber 2 and yet well above the fluid intake pipe 1 of the scrubber and so as to permit a free flow of the cleaning fluid through the water to permit the water to act upon the cleaning fluid and the particles carried over from the scrubber. The influx of the cleaning fluid from the pipe 1 is distributed over a considerable area. The openings 7 in the pipe 1 cause the liquid to pass from a number of points in the pipe 1 towards the wall of the scrubber 2. The cleaning fluid thus rises from all parts of the bottom portion of the scrubber 2 through the water 4 towards the top of the scrubber. The bottom of the basin 6 causes somewhat a disturbance in this continuous and gentle upward flow by reason of a partially baffle action on the bottom of the basin 6. The upward movement of the cleaning fluid is directed to the annular space between the side of the basin 6 and the side wall of the scrubber 2. It thus moves into the area 5 and as the foreign material separates itself from the cleaning fluid it deposits on the bottom of the scrubber or on the side wall of the scrubber or basin 6 or is held suspended temporarily in the zone 5 between the water 4 and the cleaning fluid from which the material gradually settles towards the bottom of the scrubber or the zone 5 increases in its depth by reason of continued collection of the material having a specific gravity intermediate that of the water and of the cleaning fluid.

The basin 6 collects a large part of the settling material, and, moreover, provides a means by which the dirty water may be withdrawn without withdrawing a material amount of the gasoline. A pipe 8 is connected to the bottom of the basin 6. It is provided with a valve 9 whereby the water may be drawn as desired continuously or intermittently from the scrubber 2. The basin 6 is provided with an inwardly extending ledge 10 which enables the separation of the cleaning fluid from the water as it is drawn at an imperceptible rate over the upper edge of the basin 6 and the inner edge of the ledge 10. The opening 11 formed within the inner edge of the ledge 10, is, as compared to the size of the pipe 8, very large, so that the current movement is exceedingly small. The size of the top of the basin 6 as defined by the upper edge of the basin is considerably larger, which causes a correspondingly greater reduction in the current movement of the water as it is being drawn from the scrubber 2, with the result that practically none of the cleaning fluid will be drawn from the scrubber upon drawing the water from the basin since the movement of the water towards the inner end of the pipe is slow, and, moreover, is in a horizontal direction, namely, towards the edge of the ledge, except as it is drawn down from the sediment zone or layer between the water and gasoline, which enables substantially all of the gasoline or cleaning fluid to separate from the water that enters the pipe 8. Thus the dirty water from the scrubber may be removed as may be desired.

Removing the water from the scrubber also lowers the sediment zone 5 and thus the position of the zone 5 may be adjusted relative to the basin so as to collect as much of the suspended sediment as may be desired. In order that there may be a continuous flow from the scrubber 2 and yet maintain the level of the water substantially the same, water may be admitted through the pipe 3, which may also be provided with openings 12 located at different points along the pipe. The admission of the water from the pipe 3 over a considerable area eliminates any agitation that would be caused by a swift stream of water. The pipe 3 may be provided with the valve 13 in order to regulate the inflow of the water.

The top of the cleaning fluid in the scrubber 2 passes out through the pipe 14 to the bottom of a settling tank which also acts as a reservoir or reservation tank. The vent pipes 23 have been provided and are of height sufficient to prevent the escape of any of the liquid notwithstanding the pressure produced in other parts of the system.

We have thus provided, by our invention, a scrubber which will remove soiling materials from liquid used in dry cleaning systems during the process of cleaning. This permits the continuous flow of cleansing liquid through the cleaning system.

We claim:

1. In a dry cleaning system, a water scrubber vat for scrubbing gasoline, a pipe for introducing the gasoline into the bottom of the vat, an outlet for drawing gasoline from the top of the vat, an inlet water pipe for introducing water into the bottom of the vat, a basin located at a fixed point substantially half way between the top and the bottom of the vat, and in spaced relation to the sides, bottom and top of the vat, an outlet water pipe connected to the basin for drawing off the water from the vat through the basin, the water pipes having valves for maintaining the level of the water above and near the upper edge of the basin, the gasoline inlet pipe having a means for distributing the gasoline over the bottom of the vat as it enters the vat.

2. In a dry cleaning system for gasoline, a scrubber for scrubbing the gasoline, a basin located in spaced relation to the top and bottom of the scrubber and in the scrubber, an outlet pipe communicating with the interior of the basin for drawing the water from the scrubber, the basin having an inwardly extending portion to cause the water passing through the basin to the pipe to move in a lateral direction.

3. In a dry cleaning system for gasoline, a scrubber for scrubbing the gasoline, a basin located in spaced relation to the top and bottom of the scrubber and in proximity to the sediment zone between the water and the gasoline, an outlet pipe communicating with the interior of the basin for drawing the water from the scrubber, the basin having an inwardly extending portion to cause the water passing through the basin to the pipe to move in a lateral direction.

4. The process of cleaning gasoline used in dry cleaning systems from sediment, which consists in directing the dirty gasoline into a vat containing substantially still water, maintaining the level of the water at a point between the top and bottom of the vat and a sediment zone located between a point near the top of the water and a point near the bottom of the gasoline and collecting the sediment near the bottom of the sediment zone by slowly drawing the water with the sediment from near the bottom of the sediment zone.

5. The process of cleaning gasoline used in dry cleaning systems from sediment which consists in directing the dirty gasoline into a vat containing substantially still water under pressure maintaining the pressure of the water and of the gasoline so as to maintain the level of the water at a point between the top and bottom of the vat and a sediment zone located between a point near the top of the water and a point near the bottom of the gasoline, introducing the water and the gasoline at the bottom of the vat and collecting the sediment in the water near the top of the level of the water, drawing the water slowly from near the bottom of the sediment zone and drawing the cleansed gasoline slowly from the top of the tank, the flow of the liquids being such as to maintain the sediment zone midway between the top and the bottom of the vat.

In testimony whereof, we have hereunto signed our names to this specification.

MAURICE M. SCHWAB.
SAMUEL S. SCHWAB.